(12) United States Patent
Song et al.

(10) Patent No.: US 10,730,454 B2
(45) Date of Patent: Aug. 4, 2020

(54) NVH PAD FOR A VEHICLE

(71) Applicants: HYUNDAI MOTOR COMPANY, Seoul (KR); KIA MOTORS CORPORATION, Seoul (KR)

(72) Inventors: Won Jung Song, Seoul (KR); Hyun Kyung Park, Pyeongtaek-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 342 days.

(21) Appl. No.: 15/807,862

(22) Filed: Nov. 9, 2017

(65) Prior Publication Data

US 2018/0361951 A1 Dec. 20, 2018

(30) Foreign Application Priority Data

Jun. 16, 2017 (KR) .................. 10-2017-0076657

(51) Int. Cl.
*B60R 13/08* (2006.01)
*F16B 21/08* (2006.01)
*F16B 2/22* (2006.01)
*F16B 5/12* (2006.01)
*F16B 13/08* (2006.01)

(52) U.S. Cl.
CPC .............. *B60R 13/08* (2013.01); *F16B 2/22* (2013.01); *F16B 21/084* (2013.01); *B60R 2013/0807* (2013.01); *F16B 5/126* (2013.01); *F16B 13/0833* (2013.01)

(58) Field of Classification Search
CPC ... B60R 13/08; B60R 2013/0807; F16B 2/22; F16B 21/084; F16B 5/126; F16B 13/0833

USPC .......................................................... 181/290
See application file for complete search history.

(56) References Cited

U.S. PATENT DOCUMENTS

| 4,064,960 | A | * | 12/1977 | Murakami | E01F 8/007 |
| | | | | | 181/210 |
| 4,487,291 | A | * | 12/1984 | Walker | E04B 2/7403 |
| | | | | | 181/290 |
| 6,266,936 | B1 | * | 7/2001 | Gelin | E04B 2/7412 |
| | | | | | 52/481.1 |
| 7,503,429 | B2 | * | 3/2009 | Boyce | B60R 13/02 |
| | | | | | 181/210 |
| 2010/0032234 | A1 | * | 2/2010 | Niwa | B60R 13/0838 |
| | | | | | 181/290 |
| 2013/0098707 | A1 | * | 4/2013 | Yamamoto | B60R 13/083 |
| | | | | | 181/290 |
| 2016/0355147 | A1 | * | 12/2016 | Zielinski | F16B 39/26 |

FOREIGN PATENT DOCUMENTS

| KR | 20180060670 | 6/2018 |
| WO | WO-03020555 A1 * | 3/2003 | .............. F16B 37/04 |

* cited by examiner

*Primary Examiner* — Forrest M Phillips
(74) *Attorney, Agent, or Firm* — Lempia Summerfield Katz LLC

(57) ABSTRACT

A vehicle NVH pad includes an outer pad, a support pad connected to the outer pad, and one or more inner pads pivotally connected to opposite sides of the support pad. The one or more inner pads may include a first inner pad pivotally connected to one side of the support pad through a first hinge connection and a second inner pad pivotally connected to an opposite side of the support pad through a second hinge connection.

14 Claims, 14 Drawing Sheets

NVH PAD FOR A VEHICLE

CROSS-REFERENCE TO RELATED APPLICATION

This application is based on and claims the benefit of priority to Korean Patent Application No. 10-2017-0076657, filed on Jun. 16, 2017, in the Korean Intellectual Property Office, the disclosure of which is incorporated herein in its entirety by reference.

TECHNICAL FIELD

The present disclosure relates to an NVH pad for a vehicle structural member. More specifically, the present disclosure relates to a vehicle NVH pad for simplifying an assembly process and enhancing assembly accuracy by reducing the number of components.

BACKGROUND

A vehicle body may be constituted by a plurality of panels and a plurality of structural members. The structural members may be joined to the panels by welding. A noise, vibration, and harshness (NVH) pad may be installed on the inside of the vehicle structural members to block noise introduced into the structural members.

FIG. 1 illustrates a structure in which an NVH pad in the related art is installed on the inside of a panel and a structural member. The NVH pad may include a first foam pad 3 bonded to a panel 1, a second foam pad 4 bonded to a structural member 2, and a plate pad 5 installed on an outer surface of the structural member 2.

The first foam pad 3 and the second foam pad 4 may be formed of an adhesive deadening pad.

A process of assembling the NVH pad is as follows. The first foam pad 3 may be bonded to the panel 1 and the second foam pad 4 may be bonded to the structural member 2. Then the structural member 2 may be secured to the panel 1 by welding. The plate pad 5 may be finally assembled to the outer surface of the structural member 2.

As described above, the NVH pad in the related art has a large number of components to be assembled. Also, an excessive number of assembly steps are required to assemble the NVH pad. In addition, the foam pads 3 and 4 are visually bonded to the panel 1 and the structural member 2. As a result, bonding reliability (accuracy) of the foam pads may be deteriorated. Also, an inner space between the panel 1 and the structural member 2 may not be adequately filled with the foam pads 3 and 4.

Furthermore, bonding reliability may be deteriorated since the first foam pad 3 and the second foam pad 4 are formed of a deadening pad having an adhesive property that may easily vary depending on temperature.

SUMMARY

The present disclosure is made to solve the above-mentioned problems occurring in the related art while advantages achieved by the related art are maintained intact.

An aspect of the present disclosure provides a vehicle NVH pad for simplifying an assembly process and enhancing assembly accuracy by reducing the number of components.

The technical problems to be solved by the present disclosure are not limited to the aforementioned problems. Any other technical problems not mentioned herein will be clearly understood from the following description by those having ordinary skill in the art to which the present disclosure pertains.

According to an aspect of the present disclosure, a vehicle NVH pad includes an outer pad, a support pad connected to the outer pad, and one or more inner pads movably connected to the support pad.

A pair of the inner pads may be pivotally connected to opposite sides of the support pad.

The pair of the inner pads may include a first inner pad pivotally connected to one side of the support pad through a first hinge connection and a second inner pad pivotally connected to an opposite side of the support pad through a second hinge connection.

The first hinge connection may flexibly connect the first inner pad and the one side of the support pad.

The first hinge connection may be formed of a flexible material having elasticity.

The second hinge connection may flexibly connect the second inner pad and the opposite side of the support pad.

The second hinge connection may be formed of a flexible material having elasticity.

The first inner pad and the support pad may be vertically spaced apart from each other.

The second inner pad and the support pad may be vertically spaced apart from each other.

The support pad may be disposed between the first inner pad and the second inner pad in a vertical direction and may be separately spaced apart from the first inner pad and the second inner pad.

The first inner pad may have a first guide extending toward the support pad.

The second inner pad may have a second guide extending toward the support pad.

The support pad may include a top support member, a bottom support member vertically spaced apart from the top support member, and a middle support member interposed between the top support member and the bottom support member. The middle support member may be formed of a foam material.

The first inner pad may include a first top member, a first bottom member vertically spaced apart from the first top member, and a first middle member interposed between the first top member and the first bottom member. The first middle member may be formed of a foam material.

The second inner pad may include a second top member, a second bottom member vertically spaced apart from the second top member, and a second middle member interposed between the second top member and the second bottom member. The second middle member may be formed of a foam material.

A connecting rib may be interposed between the first hinge connection and the second hinge connection and may connect the first middle member of the first inner pad and the second middle member of the second inner pad.

The first hinge connection may connect the first top member of the first inner pad and the top support member of the support pad.

The second hinge connection may connect the connecting rib and the second bottom member of the second inner pad.

According to the present disclosure, assembly accuracy and quality of the NVH pad may be enhanced since the NVH pad has a structure in which the first and second inner pads symmetrically pivot toward the support pad when the first and second inner pads and the support pad are inserted into an inner space of a hollow structural member.

Furthermore, the present disclosure provides an advantageous effect of simplifying an assembly process and enhancing assembly efficiency by reducing the number of components.

In addition, according to the present disclosure, the foam quality of the NVH pad may be enhanced since the outer pad, the support pad, and the inner pads each have a structure in which a foam material is sandwiched between flexible materials. Thus, NVH performance may be further improved.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
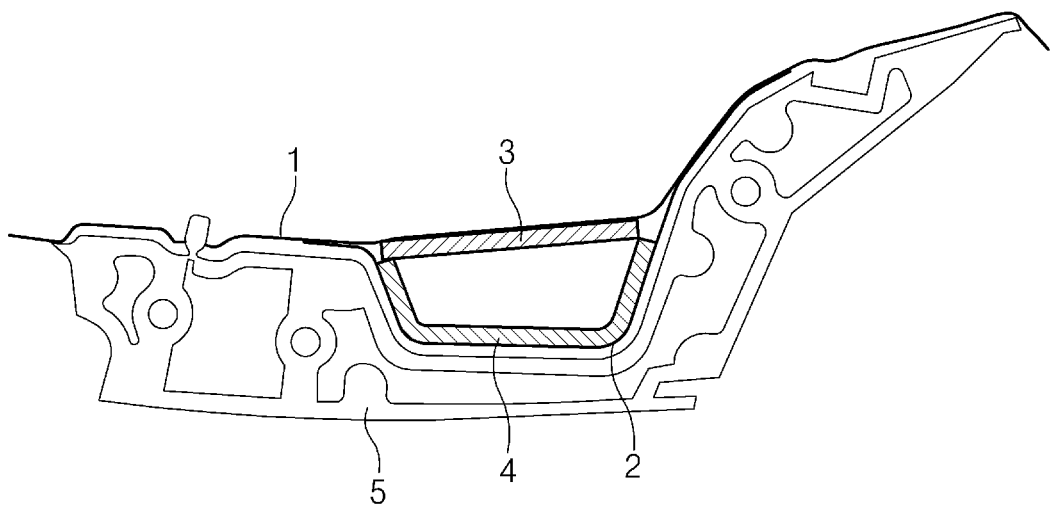
FIG. 1 illustrates a structure in which a vehicle NVH pad in the related art is installed on the inside of a panel and a hollow structural member.

Hereinafter, embodiments of the present disclosure are described in detail with reference to the accompanying drawings. In the drawings, the same reference numbers are used throughout to designate the same or equivalent elements. In addition, a detailed description of well-known features or functions is excluded in order to avoid unnecessarily obscuring the gist of the present disclosure.

Terms, such as "first", "second", "A", "B", "(a)", "(b)", and the like, may be used herein to describe elements of the present disclosure. Such terms are only used to distinguish one element from another element. The substance, sequence, order, or number of these elements is not limited by the use of these terms. Unless otherwise defined, all terms used herein, including technical and scientific terms, have the same meaning as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Figure 2:
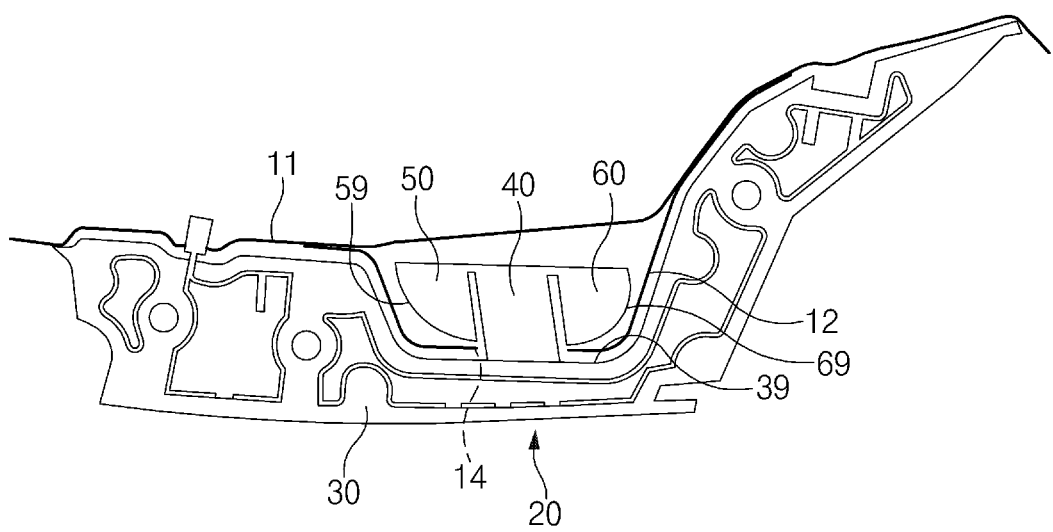
FIG. 2 illustrates a structure in which a vehicle NVH pad according to an embodiment of the present disclosure is installed between a panel and a hollow structural member.

Referring to FIG. 2, an NVH pad 20 according to an embodiment of the present disclosure may be mounted in a hollow structural member 12. The hollow structural member 12 may be attached to a panel 11 by welding. The hollow structural member 12 may have a mounting hole 14 formed on a side thereof. The NVH pad 20 may be mounted in the hollow structural member 12 through the mounting hole 14 of the hollow structural member 12. Accordingly, the NVH pad 20 may fill a closed space defined by the hollow structural member 12 and the panel 11 to implement NVH performance.

Figure 3:
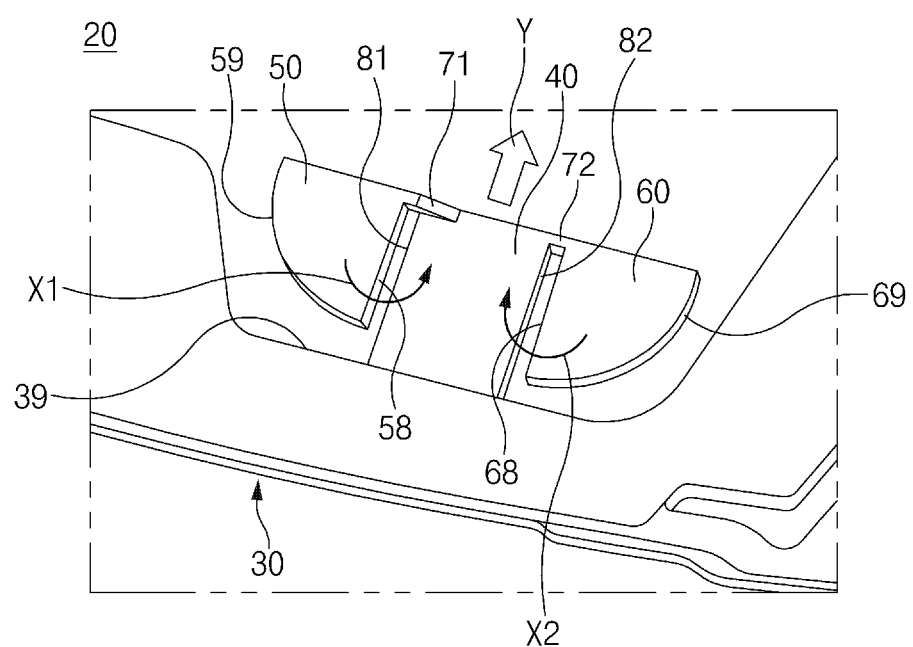
FIG. 3 is a view schematically illustrating the vehicle NVH pad according to an embodiment of the present disclosure.

Referring to FIG. 3, the NVH pad 20 according to an embodiment of the present disclosure may include an outer pad 30 attached to an outer surface of the hollow structural member 12. The NVH pad 20 may also include a support pad 40 and a pair of inner pads 50 and 60 that are inserted into the hollow structural member 12.

The outer pad 30 may have a recess 39 and the recess 39 may have a contour corresponding to the outer surface of the hollow structural member 12. Accordingly, the recess 39 of the outer pad 30 may be brought into close contact with the outer surface of the hollow structural member 12. Thus, the outer pad 30 may be firmly attached to the outer surface of the hollow structural member 12.

The support pad 40 may be integrally connected to the outer pad 30. Particularly, the support pad 40 may be connected to a central portion of the recess 39 of the outer pad 30.

The support pad 40 may have a first side surface 81 formed on one side thereof and a second side surface 82 formed on an opposite side thereof. The first side surface 81 and the second side surface 82 may be arranged parallel to each other.

The pair of inner pads 50 and 60 may be movably connected to the support pad 40. According to an embodiment, the pair of inner pads 50 and 60 may be pivotally connected to the support pad 40 through hinge connections 71 and 72. The hinge connections 71 and 72 may be formed of a flexible material having elasticity. Accordingly, the pair of inner pads 50 and 60 may relatively move toward the support pad 40 to overlap the support pad 40 if an external force is applied to the pair of inner pads 50 and 60. The pair of inner pads 50 and 60 may return to the original positions if the external force is released.

According to an embodiment of the present disclosure, the pair of inner pads 50 and 60 may be pivotally connected to opposite sides of the support pad 40. The pair of inner pads 50 and 60 may include the first inner pad 50 pivotally connected to one side of the support pad 40 and the second inner pad 60 pivotally connected to an opposite side of the support pad 40.

The first inner pad 50 may be pivotally connected to one side of the support pad 40 through the first hinge connection 71. The bottom surface of the first inner pad 50 and the top surface of the support pad 40 (or the top surface of the first inner pad 50 and the bottom surface of the support pad 40) may be spaced apart from each other. Therefore, the first inner pad 50 may overlap the support pad 40 when the first inner pad 50 pivots toward the support pad 40. The first hinge connection 71 may flexibly connect the first inner pad 50 and one side of the support pad 40 to allow the first inner pad 50 to pivot toward the support pad 40 or return to the original position.

The first inner pad 50 may have a side surface 58 facing the first side surface 81 of the support pad 40. The side surface 58 of the first inner pad 50 and the first side surface 81 of the support pad 40 may be spaced apart from each other so as not to affect the pivoting of the first inner pad 50.

The first inner pad 50 may have an inclined surface or a curved surface 59. The inclined surface or the curved surface 59 may be formed on the opposite side to the side surface 58. Accordingly, the first inner pad 50 may be prevented from interfering with the recess 39 of the outer pad 30 when the first inner pad 50 pivots toward the support pad 40.

The second inner pad 60 may be pivotally connected to the opposite side of the support pad 40 through the second hinge connection 72. The top surface of the second inner pad 60 and the bottom surface of the support pad 40 (or the bottom surface of the second inner pad 60 and the top surface of the support pad 40) may be spaced apart from each other. Therefore, the second inner pad 60 may overlap the support pad 40 when the second inner pad 60 pivots toward the support pad 40. The second hinge connection 72 may flexibly connect the second inner pad 60 and the opposite side of the support pad 40 to allow the second inner pad 60 to pivot toward the support pad 40 or return to the original position.

The second inner pad 60 may have a side surface 68 facing the second side surface 82 of the support pad 40. The side surface 68 of the second inner pad 60 and the second side surface 82 of the support pad 40 may be spaced apart from each other so as not to affect the pivoting of the second inner pad 60.

The second inner pad 60 may have an inclined surface or a curved surface 69. The inclined surface or the curved surface 69 may be formed on the opposite side to the side surface 68. Accordingly, the second inner pad 60 may be prevented from interfering with the recess 39 of the outer pad 30 when the second inner pad 60 pivots toward the support pad 40.

The first hinge connection 71 and the second hinge connection 72 may be formed of a flexible material having elasticity. Accordingly, when an external force is applied to the first and second inner pads 50 and 60, the first and second inner pads 50 and 60 may easily pivot toward the support pad 40 facilitated by the flexibility of the first and second hinge connections 71 and 72. If the external force is released, the first and second inner pads 50 and 60 may easily return to the original positions by elastic force of the first and second hinge connections 71 and 72.

According to this configuration, the support pad 40 and the pair of inner pads 50 and 60 may be inserted into the inner space of the hollow structural member 12 through the mounting hole 14 when the NVH pad 20 is pushed toward the hollow structural member 12 (see the direction of arrow Y in FIG. 3). When the pair of inner pads 50 and 60 and the support pad 40 are inserted through the mounting hole 14, an external force may be applied to the pair of inner pads 50 and 60 by the periphery of the mounting hole 14. The first inner pad 50 and the second inner pad 60 may pivot toward the support pad 40 (see the directions X1 and X2 in FIG. 3). Further, if the first inner pad 50 and the second inner pad 60 are completely inserted into the inner space of the hollow structural member 12, the first inner pad 50 and the second inner pad 60 may return to the original positions by restoring forces, i.e., the elasticity or resiliency of the first hinge connection 71 and the second hinge connection 72.

In this disclosed embodiment, the pair of inner pads 50 and 60 is pivotally connected to the opposite sides of the support pad 40 in a symmetric arrangement as described above. As a result, the support pad 40 and the pair of inner pads 50 and 60 of the NVH pad 20 may be efficiently inserted into the inner space of the hollow structural member 12 in an easy and simple manner to effectively block the inner space of the hollow structural member 12, thereby significantly enhancing NVH performance.

FIGS. 4-10 illustrate the NVH pad 20 according to a specific embodiment of the present disclosure.

Figure 4:
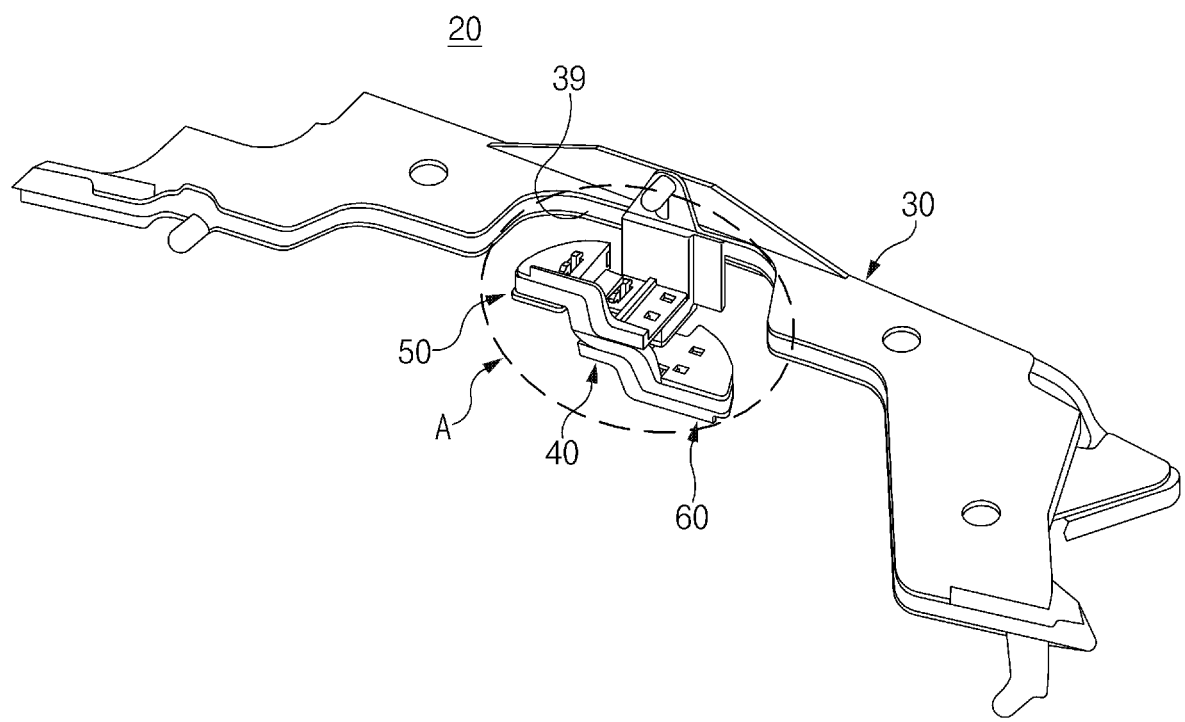
FIG. 4 is a perspective view of the vehicle NVH pad of FIG. 3 according to an embodiment of the present disclosure.
Figure 5:
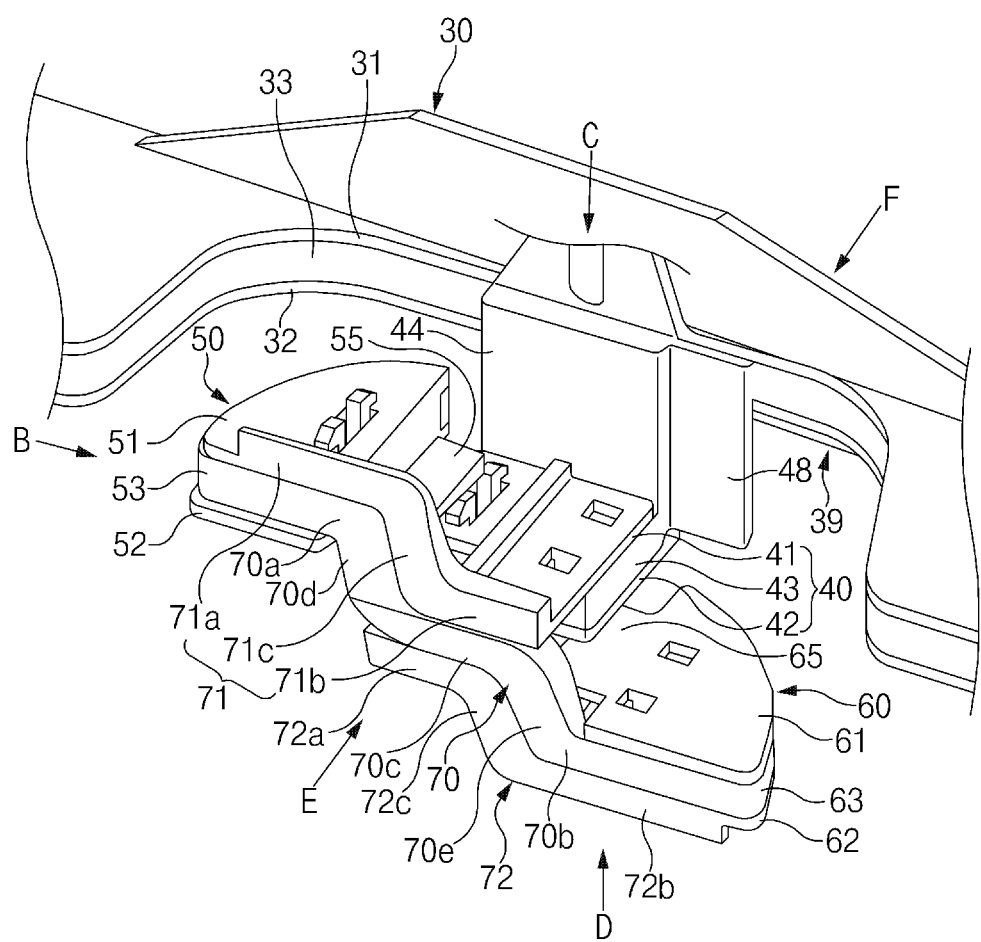
FIG. 5 is a blowup of detail A in FIG. 4.

Referring to FIGS. 4 and 5, the outer pad 30 may include a top plate 31, a bottom plate 32 vertically spaced apart from the top plate 31, and a middle plate 33 interposed between the top plate 31 and the bottom plate 32.

According to an embodiment, the top plate 31 and the bottom plate 32 may be formed of a flexible material, such as a synthetic resin. The middle plate 33 may be formed of a foam material.

The top plate 31, the middle plate 33, and the bottom plate 32 may be vertically stacked one above another. The top plate 31, the middle plate 33, and the bottom plate 32 may be bonded together by an adhesive or may be integrated together by insert molding.

As described above, the middle plate 33 of a foam material may be sandwiched between the top and bottom plates 31 and 32 of a flexible material. Thus, the foam quality of the outer pad 30 may be enhanced.

Figure 6:
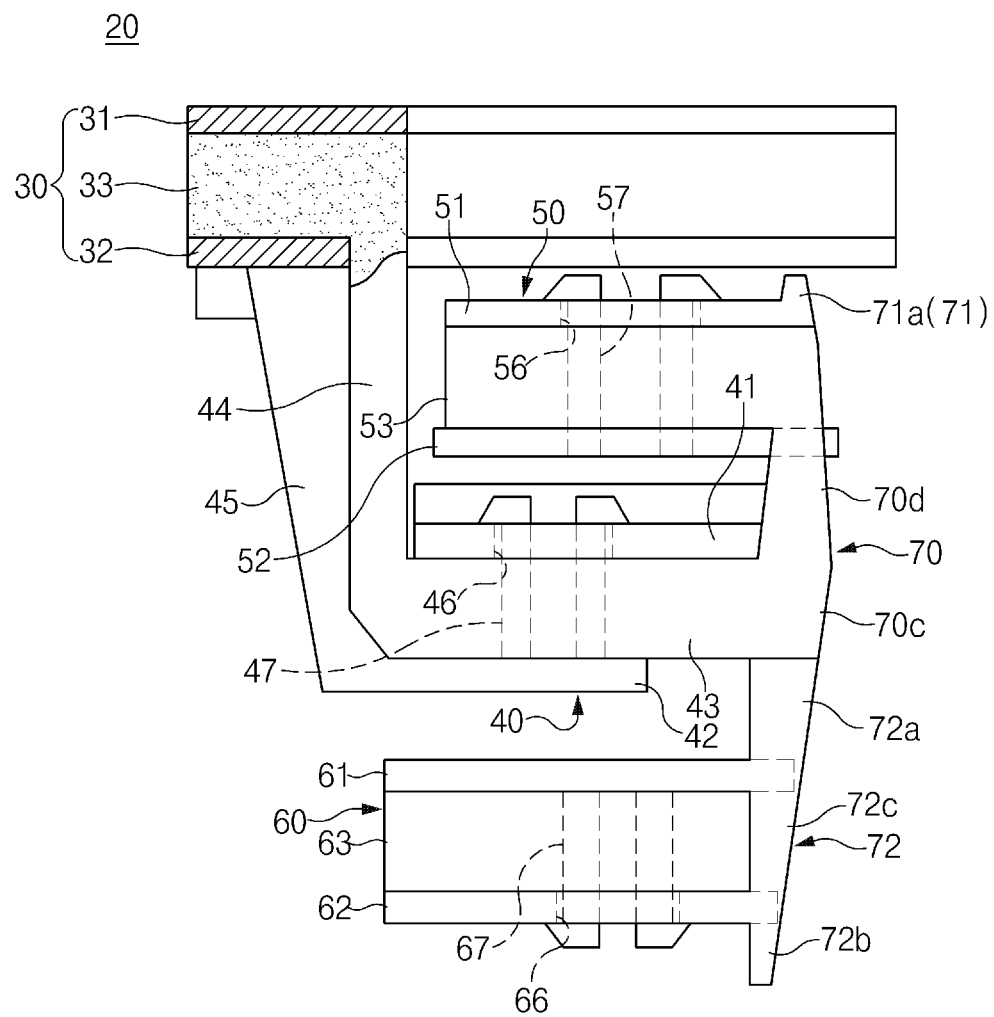
FIG. 6 is a view of the vehicle NVH pad when viewed in the direction of arrow B in FIG. 5.
Figure 7:
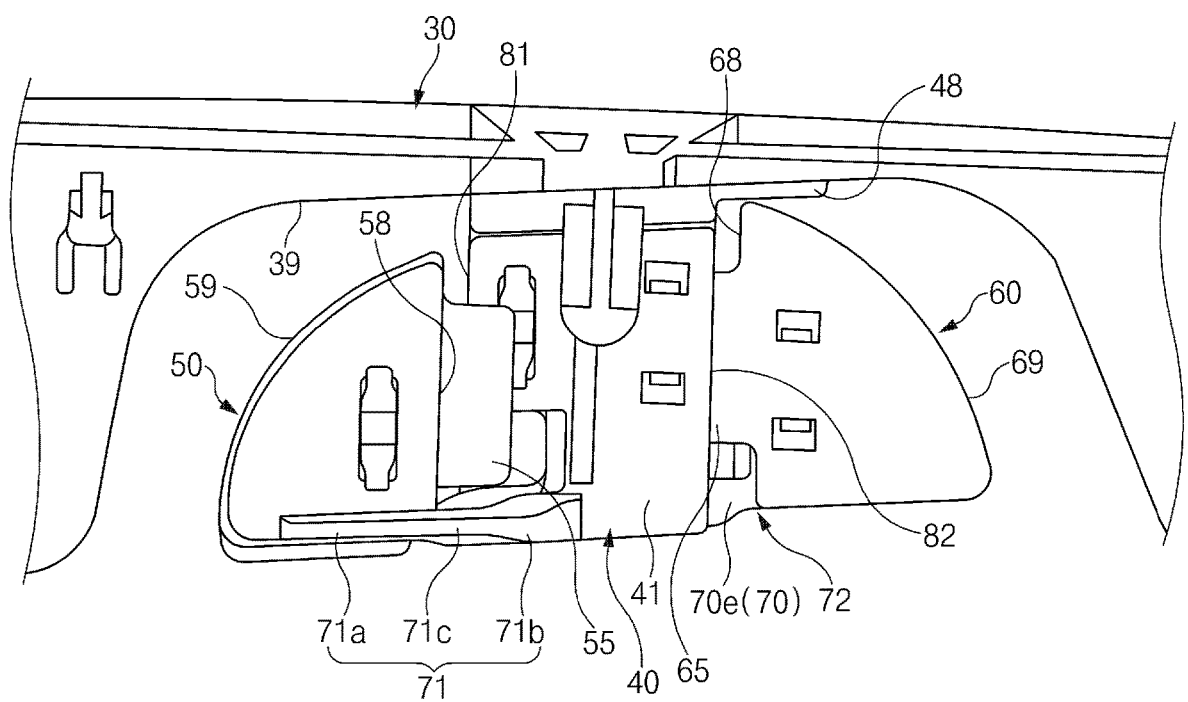
FIG. 7 is a view of the vehicle NVH pad when viewed in the direction of arrow C in FIG. 5.
Figure 8:
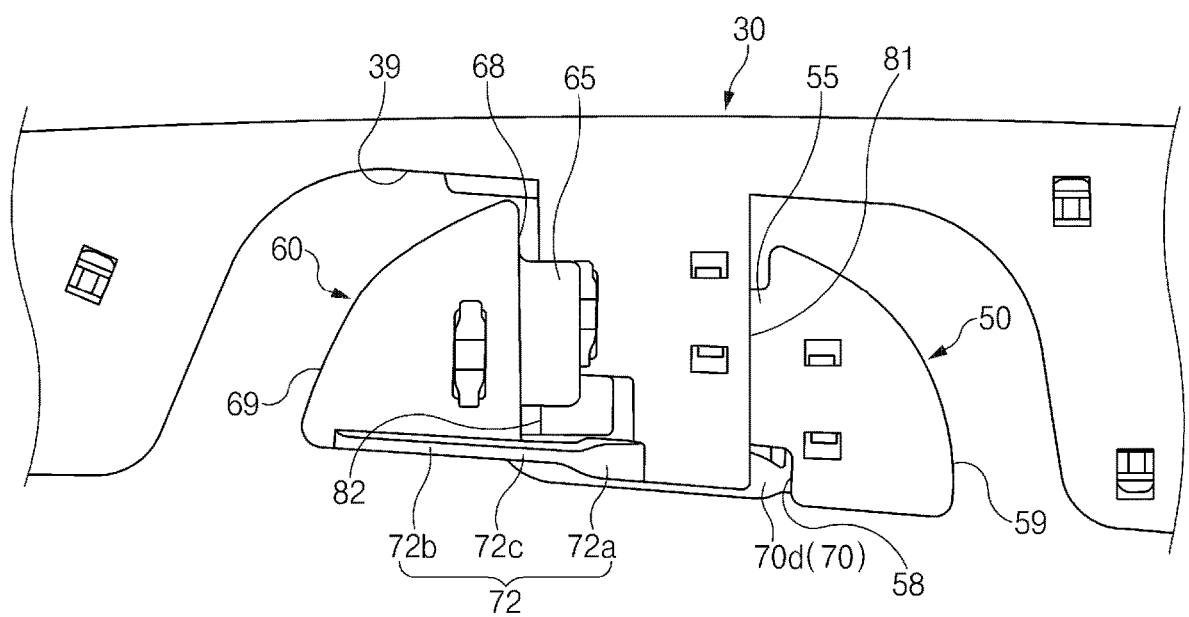
FIG. 8 is a view of the vehicle NVH pad when viewed in the direction of arrow D in FIG. 5.
Figure 9:
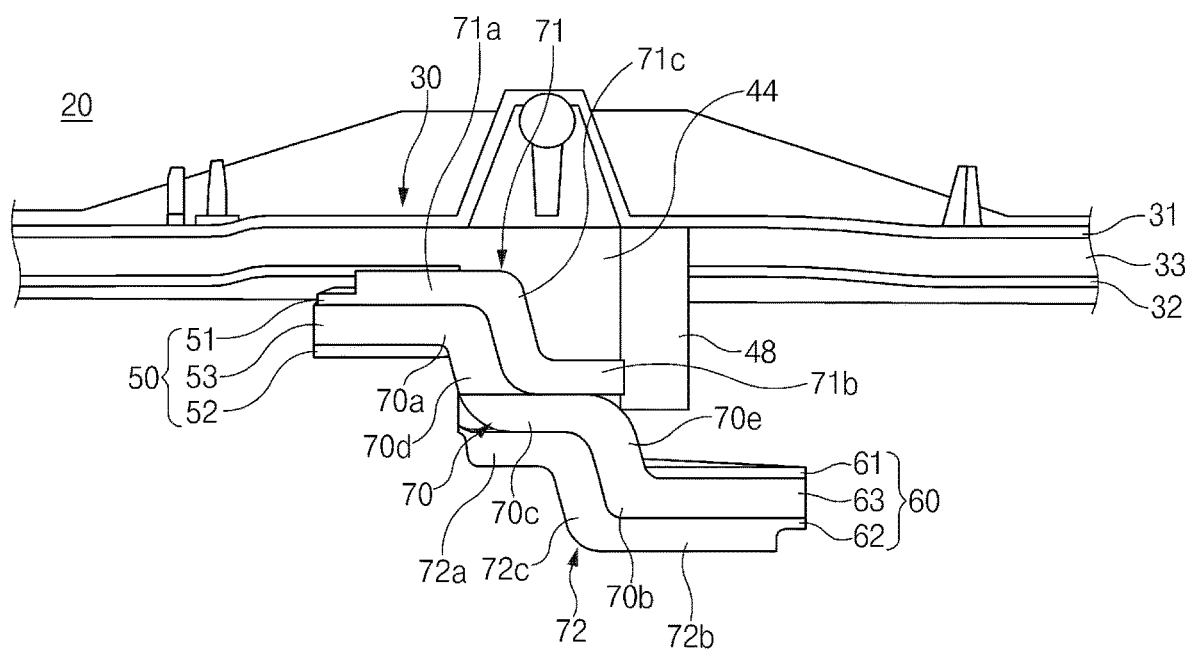
FIG. 9 is a view of the vehicle NVH pad when viewed in the direction of arrow E in FIG. 5.
Figure 10:
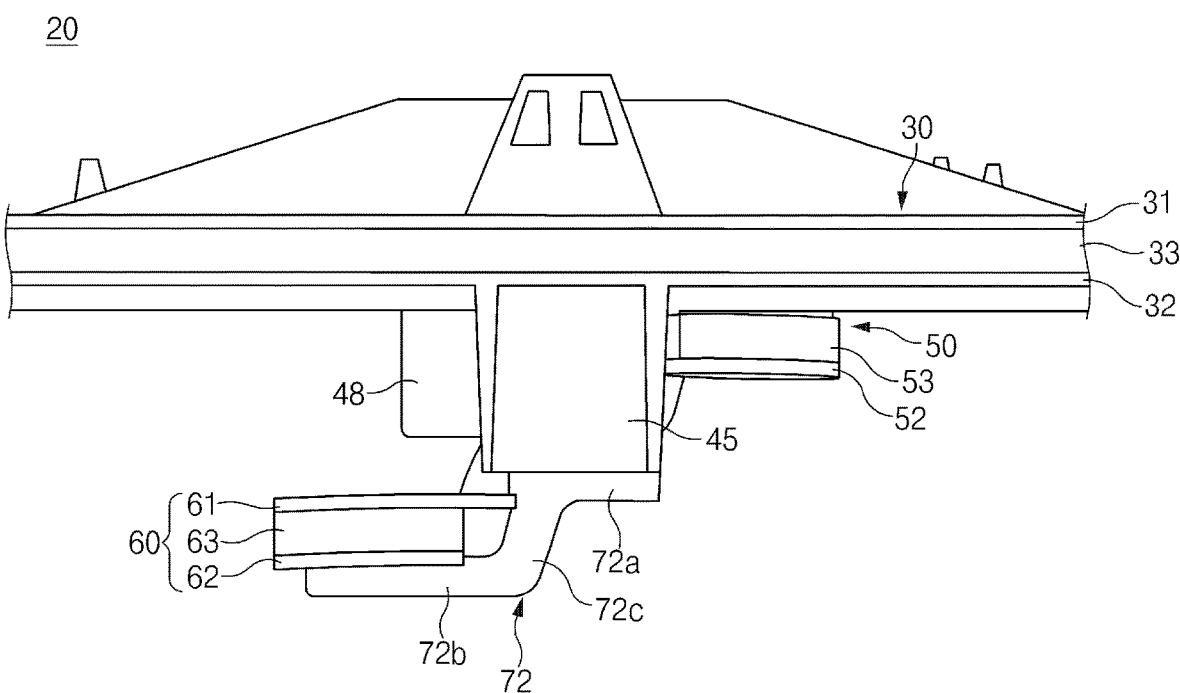
FIG. 10 is a view of the vehicle NVH pad when viewed in the direction of arrow F in FIG. 5.

Referring to FIGS. 5 and 6, the support pad 40 may include a top support member 41 and a bottom support member 42 vertically spaced apart from the top support member 41.

According to an embodiment, the top support member 41 and the bottom support member 42 may be formed of a flexible material, such as a synthetic resin.

A middle support member 43 may be interposed between the top support member 41 and the bottom support member 42. Thus, the top support member 41, the middle support member 43, and the bottom support member 42 may be vertically stacked one above another.

According to an embodiment, the middle support member 43 may be formed of a foam material.

As described above, the middle support member 43 of a foam material may be sandwiched between the top and bottom support members 41 and 42 of a flexible material. Thus, the foam quality of the support pad 40 may be enhanced.

The top support member 41, the bottom support member 42, and the middle support member 43 may be vertically coupled together by an adhesive, a snap-fit connection, or the like.

According to an embodiment, as illustrated in FIG. 6, the top support member 41 may have an engagement slot 46 and the bottom support member 42 may have an engagement hook 47 extending in a vertical direction. The engagement hook 47 may pass through the middle support member 43 and then snap into the engagement slot 46. Thus, the top support member 41, the bottom support member 42, and the middle support member 43 may be vertically stacked and coupled together.

The middle support member 43 may be integrally connected to the middle plate 33 of the outer pad 30 through a first extension 44. The first extension 44 may vertically extend from the middle plate 33, and the middle support member 43 may extend horizontally. As a result, the middle support member 43 may be perpendicular to the first extension 44.

The bottom support member 42 may be integrally connected to the bottom plate 32 of the outer pad 30 through a second extension 45. The second extension 45 may vertically extend from the bottom plate 32, and the bottom support member 42 may extend horizontally. As a result, the bottom support member 42 may be perpendicular to the second extension 45.

As illustrated in FIG. 6, the support pad 40 may be disposed between the first inner pad 50 and the second inner pad 60 in the vertical direction and may be separately spaced apart from the first inner pad 50 and the second inner pad 60.

Referring to FIGS. 5 and 6, the first inner pad 50 may include a first top member 51, a first bottom member 52 vertically spaced apart from the first top member 51, and a first middle member 53 interposed between the first top member 51 and the first bottom member 52.

According to an embodiment, the first top member 51 and the first bottom member 52 may be formed of a flexible material, such as a synthetic resin. The first middle member 53 may be formed of a foam material.

The first top member 51, the first middle member 53, and the first bottom member 52 may be vertically stacked one above another. The first top member 51, the first middle member 53, and the first bottom member 52 may be vertically coupled by an adhesive, a snap-fit connection, or the like.

As described above, the first middle member 53 of a foam material may be sandwiched between the first top and bottom members 51 and 52 of a flexible material. Thus, the foam quality of the first inner pad 50 may be enhanced.

According to an embodiment, as illustrated in FIG. 6, the first top member 51 may have an engagement slot 56 and the first bottom member 52 may have an engagement hook 57 extending in the vertical direction. The engagement hook 57 may pass through the first middle member 53 and then snap into the engagement slot 56. Thus, the first top member 51, the first middle member 53, and the first bottom member 52 may be vertically stacked and coupled together.

Referring to FIGS. 5 and 6, the second inner pad 60 may include a second top member 61, a second bottom member 62 vertically spaced apart from the second top member 61, and a second middle member 63 interposed between the second top member 61 and the second bottom member 62.

According to an embodiment, the second top member 61 and the second bottom member 62 may be formed of a flexible material, such as a synthetic resin. The second middle member 63 may be formed of a foam material.

The second top member 61, the second middle member 63, and the second bottom member 62 may be vertically stacked one above another. The second top member 61, the second middle member 63, and the second bottom member 62 may be vertically coupled by an adhesive, a snap-fit connection, or the like.

As described above, the second middle member 63 of a foam material may be sandwiched between the second top and bottom members 61 and 62 of a flexible material. Thus, the foam quality of the second inner pad 60 may be enhanced.

According to an embodiment, as illustrated in FIG. 6, the second bottom member 62 may have an engagement slot 66 and the second top member 61 may have an engagement hook 67 extending in the vertical direction. The engagement hook 67 may pass through the second middle member 63 and then snap into the engagement slot 66. Thus, the second top member 61, the second bottom member 62, and the second middle member 63 may be vertically stacked and coupled together.

The first middle member 53 of the first inner pad 50 and the second middle member 63 of the second inner pad 60 may be connected together through a connecting rib 70. The connecting rib 70 may have one end 70a integrally connected to a front end of the first middle member 53 and an opposite end 70b integrally connected to a front end of the second middle member 63. According to an embodiment, the connecting rib 70 may be integrally formed with the first middle member 53 and the second middle member 63 by injection molding.

The connecting rib 70 may have a horizontal portion 70c horizontally extending between the one end 70a and the opposite end 70b thereof. A first hinge portion 70d and a second hinge portion 70e may be formed on opposite sides of the horizontal portion 70c.

Since the first inner pad 50 and the support member 40 are vertically spaced apart from each other, the first hinge portion 70d may be obliquely formed between the first middle member 53 and the horizontal portion 70c. The first hinge portion 70d may be bent. Thus, the first inner pad 50 may pivot with respect to the support member 40.

Since the second inner pad 60 and the support member 40 are vertically spaced apart from each other, the second hinge portion 70e may be obliquely formed between the second middle member 63 and the horizontal portion 70c. The second hinge portion 70e may be bent. Thus, the second inner pad 60 may pivot with respect to the support member 40.

According to an embodiment, the connecting rib 70 may be formed of a foam material that is the same as that of the first and second middle members 53 and 63. Accordingly, the first and second inner pads 50 and 60 may easily pivot and return to the original positions as the first and second hinge portions 70d and 70e of the connecting rib 70 are bent.

The first hinge connection 71 may be bonded to the top surface of the connecting rib 70 and may flexibly connect the first inner pad 50 and one side of the support pad 40.

The first hinge connection 71 may be configured to connect the first top member 51 of the first inner pad 50 and the top support member 41 of the support pad 40. The first hinge connection 71 may be formed to be narrower than the first inner pad 50 and the support pad 40. Thus, the first inner pad 50 may effectively pivot toward the support pad 40 as the first hinge connection 71 is bent.

The first hinge connection 71 may have one end 71a integrally connected to a front end of the first top member 51, an opposite end 71b integrally connected to a front end of the top support member 41, and a middle portion 71c formed between the one end 71a and the opposite end 71b. According to an embodiment, the first hinge connection 71 may be integrally formed with the first top member 51 and the top support member 41 by injection molding.

The one end 71a of the first hinge connection 71 may be bonded to the one end 70a of the connecting rib 70 by an adhesive. The opposite end 71b of the first hinge connection 71 may be bonded to the horizontal portion 70c of the connecting rib 70 by an adhesive. The middle portion 71c of the first hinge connection 71 may be bonded to the first hinge portion 70d of the connecting rib 70 by an adhesive. The middle portion 71c of the first hinge connection 71 may have a length corresponding to the separation distance between the first top member 51 and the top support member 41. Accordingly, the first inner pad 50 may pivot with respect to the support pad 40 as the middle portion 71c of the first hinge connection 71 and the first hinge portion 70d of the connecting rib 70 are bent.

According to an embodiment, the first hinge connection 71 may be formed of a flexible material having elasticity. Therefore, the middle portion 71c of the first hinge connection 71 may allow the first inner pad 50 to easily pivot and return to the original position.

The first inner pad 50 and the support pad 40 may be vertically spaced apart from each other. For example, the bottom surface of the first inner pad 50 and the top surface of the support pad 40 may be vertically spaced apart from each other. Thus, the first inner pad 50 may be located at a higher position than the support pad 40. Accordingly, the first inner pad 50 may pivot to overlap the support pad 40 without interfering with the support pad 40.

The first inner pad 50 may have a first guide 55. The first guide 55 may extend toward the support pad 40. The first guide 55 may extend from the first top member 51 or the first bottom member 52 of the first inner pad 50. When the first inner pad 50 pivots toward the support pad 40, the trace or path along which the first inner pad 50 pivots may be stably maintained by the first guide 55.

When the first inner pad 50 pivots toward the top support member 41 of the support pad 40 as the first hinge portion 70d of the connecting rib 70 and the middle portion 71c of the first hinge connection 71 are bent, the first guide 55 may make contact with the top support member 41 of the support pad 40. Therefore, the first inner pad 50 may effectively pivot toward the top support member 41 of the support pad 40.

According to an embodiment, the top support member 41 of the support pad 40 and the first bottom member 52 of the first inner pad 50 may be minutely spaced apart from each other in the vertical direction. The first bottom member 52 of the first inner pad 50 may be located at a higher position than the top support member 41 of the support pad 40. Accordingly, if the first inner pad 50 pivots toward the support pad 40 as the first hinge portion 70d of the connecting rib 70 and the middle portion 71c of the first hinge connection 71 are bent, the first bottom member 52 of the first inner pad 50 may overlap the top support member 41 of the support pad 40. Further, since the first bottom member 52 of the first inner pad 50 is located at a higher position than the top support member 41 of the support pad 40, the middle portion 71c of the first hinge connection 71 may be inclined.

The second hinge connection 72 may be bonded to the bottom surface of the connecting rib 70 and may flexibly connect the second inner pad 60 and an opposite side of the support pad 40.

According to an embodiment, the second hinge connection 72 may be configured to connect the horizontal portion 70c of the connecting rib 70 and the second bottom member 62 of the second inner pad 60. The second hinge connection 72 may be formed to be narrower than the second inner pad 60 and the support pad 40. Thus, the second inner pad 60 may effectively pivot toward the support pad 40 as the second hinge connection 72 is bent.

The second hinge connection 72 may have one end 72a integrally bonded to the bottom surface of the horizontal portion 70c of the connecting rib 70, an opposite end 72b integrally connected to a front end of the second bottom member 62, and a middle portion 72c formed between the one end 72a and the opposite end 72b. According to an embodiment, the second hinge connection 72 may be integrally formed with the second bottom member 62 by injection molding.

The middle portion 72c of the second hinge connection 72 may be bonded to the bottom surface of the second hinge portion 70e of the connecting rib 70 by an adhesive. The middle portion 72c of the second hinge connection 72 may have a length corresponding to the separation distance between the horizontal portion 70c and the second bottom member 62. Accordingly, the second inner pad 60 may pivot toward the support pad 40 as the middle portion 72c of the second hinge connection 72 and the second hinge portion 70e of the connecting rib 70 are bent.

According to an embodiment, the second hinge connection 72 may be formed of a flexible material having elasticity, such as a synthetic resin. Therefore, the middle portion 72c of the second hinge connection 72 may allow the second inner pad 60 to easily pivot and return to the original position.

The second inner pad 60 and the support pad 40 may be vertically spaced apart from each other. Particularly, the second inner pad 60 may be located at a lower position than the support pad 40. Accordingly, the second inner pad 60 may effectively pivot toward the support pad 40 without interfering with the support pad 40.

The second inner pad 60 may have a second guide 65. The second guide 65 may extend toward the support pad 40. The second guide 65 may extend from the second top member 61 or the second bottom member 62 of the second inner pad 60. When the second inner pad 60 pivots toward the support pad 40, the trace or path along which the second inner pad 60 pivots may be stably maintained by the second guide 65.

When the second inner pad 60 pivots toward the bottom support member 42 of the support pad 40 as the second hinge portion 70e of the connecting rib 70 and the middle portion 72c of the second hinge connection 72 are bent, the second guide 65 may make contact with the bottom support member 42 of the support pad 40. Therefore, the second inner pad 60 may effectively pivot toward the bottom support member 42 of the support pad 40.

According to an embodiment, the bottom support member 42 of the support pad 40 and the second top member 61 of the second inner pad 60 may be minutely spaced apart from each other in the vertical direction. The second top member 61 of the second inner pad 60 may be located at a lower position than the bottom support member 42 of the support pad 40. Accordingly, if the second inner pad 60 is pivoted toward the support pad 40 by the second hinge portion 70e of the connecting rib 70 and the middle portion 72c of the second hinge connection 72, the second top member 61 of the second inner pad 60 may overlap the bottom support member 42 of the support pad 40. Further, since the second top member 61 of the second inner pad 60 is located at a lower position than the bottom support member 42 of the support pad 40, the middle portion 72c of the second hinge connection 72 may be inclined.

The present disclosure may further include one or more auxiliary covers 48. The auxiliary covers 48 may increase an area to cover the mounting hole 14 when the support pad 40 and the inner pads 50 and 60 are inserted into the mounting hole 14 of the hollow structural member 12.

According to an embodiment, the auxiliary covers 48 may extend from a side surface of the first extension 44.

A process of assembling the NVH pad 20 between the hollow structural member 12 and the panel 11 of a vehicle, according to an embodiment of the present disclosure is described in detail with reference to FIGS. 11-14.

Figure 11:
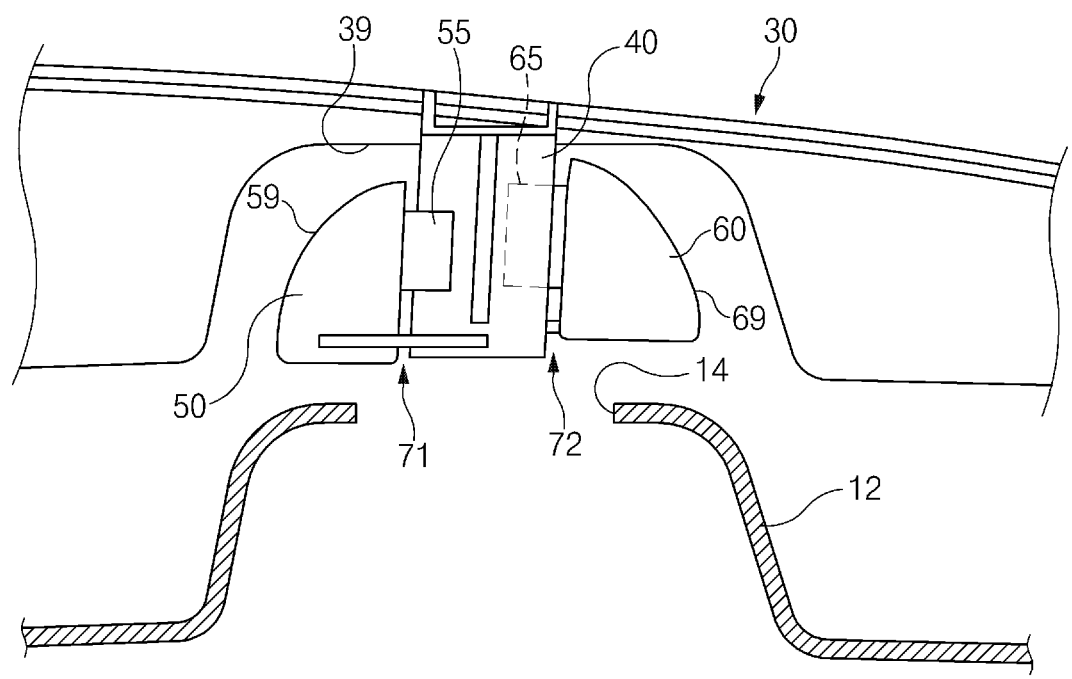
FIG. 11 illustrates a state before the vehicle NVH pad is inserted into a mounting hole of a hollow structural member according to an embodiment of the present disclosure.

As illustrated in FIG. 11, the support pad 40 and the inner pads 50 and 60 of the NVH pad 20 may be located to face the mounting hole 14 of the hollow structural member 12.

Figure 12:
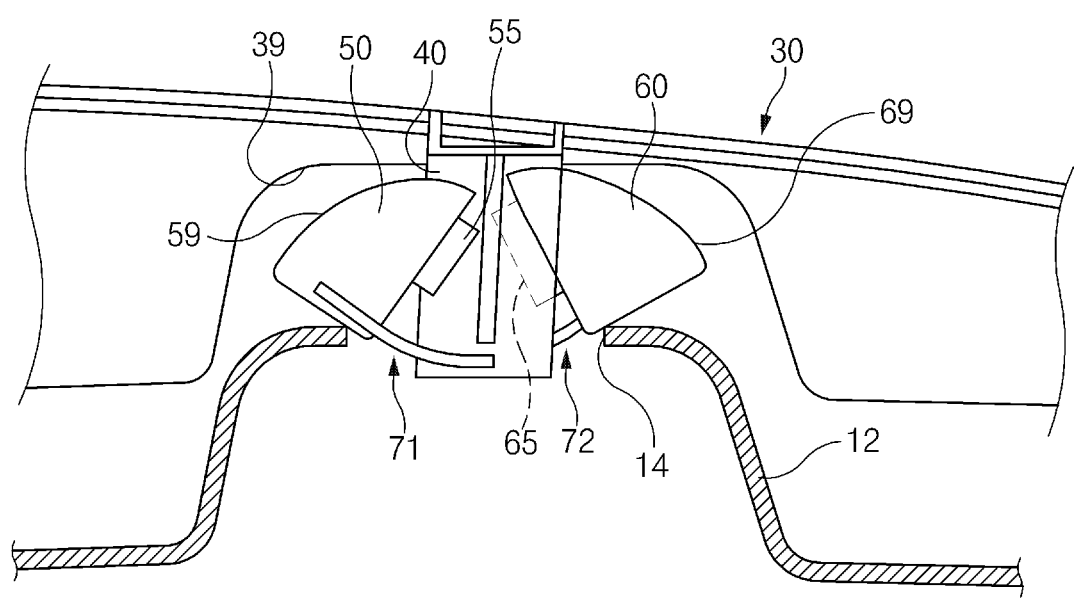
FIG. 12 illustrates a process in which a pair of inner pads pivots toward a support pad when the vehicle NVH pad is inserted into the mounting hole of the hollow structural member of FIG. 11 according to an embodiment of the present disclosure.

If the NVH pad 20 is pushed toward the hollow structural member 12, the support pad 40 and the inner pads 50 and 60 of the NVH pad 20 may be inserted into the mounting hole 14 of the hollow structural member 12, as illustrated in FIG. 12. At this time, the first inner pad 50 and the second inner pad 60 may be symmetrically pivoted toward the support pad 40 by an external force applied by the mounting hole 14.

Figure 13:
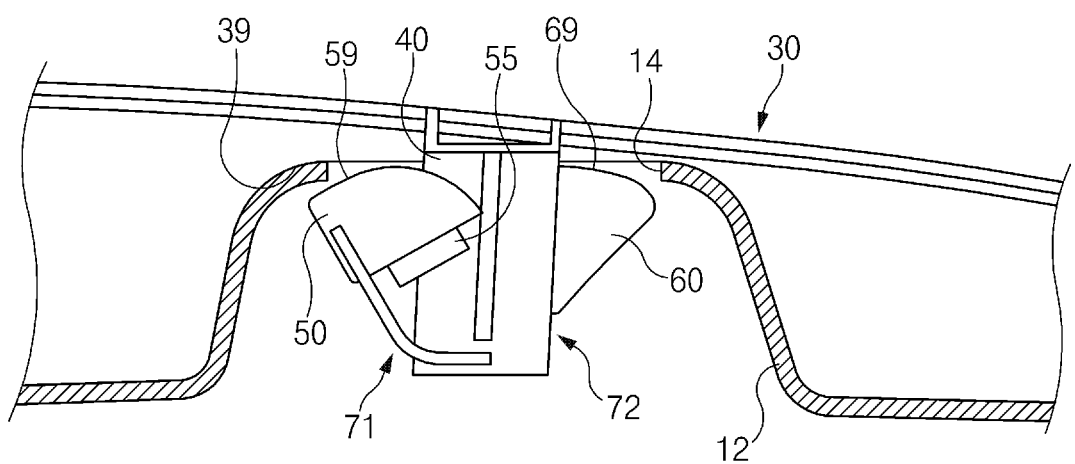
FIG. 13 illustrates a state immediately after the vehicle NVH pad is inserted into an inner space of the hollow structural member of FIG. 12 according to an embodiment of the present disclosure.

If the NVH pad 20 is pushed toward the hollow structural member 12 to allow the recess 39 of the outer pad 30 of the NVH pad 20 to make contact with the outer surface of the hollow structural member 12, the first inner pad 50 and the second inner pad 60 may pivot toward the support pad 40 at a greater angle. Thus, the support pad 40, the first inner pad 50, and the second inner pad 60 may be completely inserted into the inner space of the hollow structural member 12, as illustrated in FIG. 13.

Figure 14:
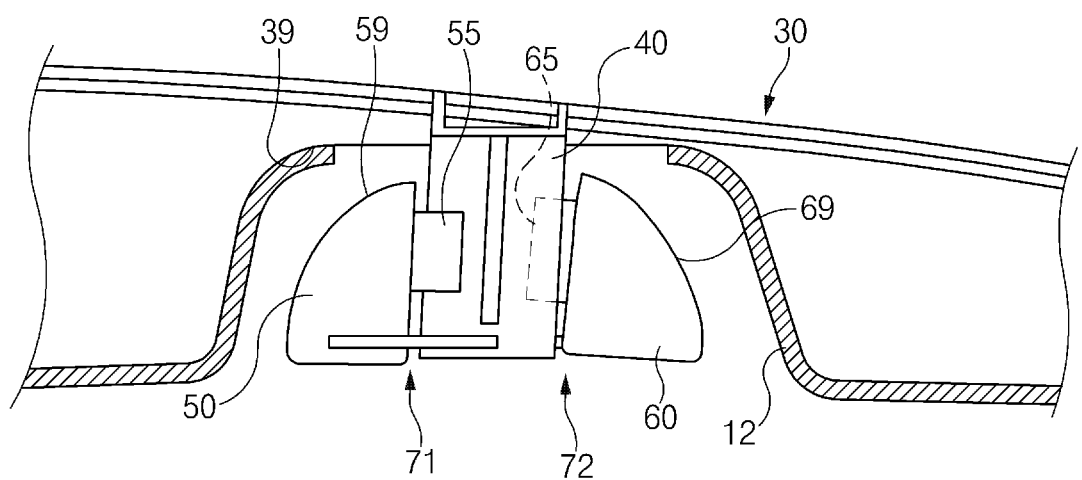
FIG. 14 illustrates a state in which the pair of inner pads returns to original positions after the vehicle NVH pad is inserted into the inner space of the hollow structural member of FIG. 13 according to an embodiment of the present disclosure.

If the support pad 40, the first inner pad 50, and the second inner pad 60 are completely inserted into the inner space of the hollow structural member 12 as described above, the first inner pad 50 and the second inner pad 60 may return to the original positions by restoring-forces of the connecting rib 70, the first hinge connection 71, and the second hinge connection 72, as illustrated in FIG. 14. The support pad 40 and the inner pads 50 and 60 of the NVH pad 20 may at least partially block the inner space of the hollow structural member 12.

The first inner pad 50 and the second inner pad 60 pivot toward the support pad 40 and then return to the original positions when the NVH pad 20 according to the present disclosure is inserted through the mounting hole 14 of the hollow structural member 12. As a result, the NVH pad 20 may be assembled in a very easy and simple manner and the accuracy with which the NVH pad 20 is assembled may be enhanced.

According to an embodiment of the present disclosure, the support pad 40, the first inner pad 50, and the second inner pad 60 have a structure in which a foam material is sandwiched between flexible materials. Thus, the foam quality of the NVH pad 20 may be enhanced and NVH performance may be further improved.

Furthermore, the NVH pad 20 according to an embodiment of the present disclosure has a structure in which the first and second inner pads 50 and 60 are pivotally connected to the opposite sides of the support pad 40. As a result, the gap between the support pad 40 and each of the inner pads 50 and 60 may be reduced. Thus, deformation may be minimized while the NVH pad 20 is stored or carried.

Although the present disclosure has been described with reference to various embodiments and the accompanying drawings, the present disclosure is not limited thereto. but the present disclosure may be variously modified and altered by those having ordinary skill in the art to which the present disclosure pertains without departing from the spirit and scope of the present disclosure.

Therefore, embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims. All the technical ideas within the scope equivalent to the claims should be included in the scope of the present disclosure.

What is claimed is:

1. An NVH pad comprising:
an outer pad;
a support pad connected to the outer pad;
a first inner pad having a free end and an opposite end that is opposite the free end, the opposite end pivotally connected to the support pad through a first hinge connection; and
a second inner pad having a free end and an opposite end that is opposite the free end, the opposite end pivotally connected to the support pad through a second hinge connection,
wherein the first hinge connection flexibly connects the first inner pad and one side of the support pad to allow the first inner pad to pivot toward the support pad, and
wherein the second hinge connection flexibly connects the second inner pad and the opposite side of the support pad to allow the second inner pad to pivot toward the support pad.

2. The NVH pad of claim 1, wherein the first hinge connection is formed of a flexible material having elasticity.

3. The NVH pad of claim 1, wherein the second hinge connection is formed of a flexible material having elasticity.

4. The NVH pad of claim 1, wherein the first inner pad and the support pad are vertically spaced apart from each other.

5. The NVH pad of claim 1, wherein the second inner pad and the support pad are vertically spaced apart from each other.

6. The NVH pad of claim 1, wherein the support pad is disposed between the first inner pad and the second inner pad in a vertical direction and is separately spaced apart from the first inner pad and the second inner pad.

7. The NVH pad of claim 1, wherein the first inner pad has a first guide extending toward the support pad.

8. The NVH pad of claim 1, wherein the second inner pad has a second guide extending toward the support pad.

9. The NVH pad of claim 1, wherein the support pad includes a top support member, a bottom support member vertically spaced apart from the top support member, and a middle support member interposed between the top support member and the bottom support member, and
wherein the middle support member is formed of a foam material.

10. The NVH pad of claim 9, wherein the first inner pad includes a first top member, a first bottom member vertically spaced apart from the first top member, and a first middle member interposed between the first top member and the first bottom member, and
wherein the first middle member is formed of a foam material.

11. The NVH pad of claim 10, wherein the second inner pad includes a second top member, a second bottom member vertically spaced apart from the second top member, and a second middle member interposed between the second top member and the second bottom member, and
wherein the second middle member is formed of a foam material.

12. The NVH pad of claim 11, wherein a connecting rib is interposed between the first hinge connection and the second hinge connection and connects the first middle member of the first inner pad and the second middle member of the second inner pad.

13. The NVH pad of claim 12, wherein the first hinge connection connects the first top member of the first inner pad and the top support member of the support pad.

14. The NVH pad of claim 13, wherein the second hinge connection connects the connecting rib and the second bottom member of the second inner pad.

* * * * *